United States Patent [19]

Osawa

[11] Patent Number: 5,621,732
[45] Date of Patent: Apr. 15, 1997

[54] ACCESS METHOD AND A RELAY STATION AND TERMINALS THEREOF

[75] Inventor: Tomoki Osawa, Tokyo, Japan

[73] Assignee: NEC Corporation, Japan

[21] Appl. No.: 423,105

[22] Filed: Apr. 18, 1995

[30] Foreign Application Priority Data

Apr. 18, 1994 [JP] Japan .................................. 6-078296

[51] Int. Cl.$^6$ ................................................. H04B 7/204
[52] U.S. Cl. ...................... 370/79; 370/85.2; 370/110.1; 379/58; 455/10; 455/11.1; 455/52.1
[58] Field of Search ................................ 370/54, 60, 75, 370/79, 85.2, 85.3, 94.1, 110.1; 379/58, 59, 63; 455/7, 8, 10, 11.1, 15, 49.1, 52.1

[56] References Cited

U.S. PATENT DOCUMENTS

| | | | |
|---|---|---|---|
| 3,955,140 | 5/1976 | Stephens et al. | 455/11.1 |
| 4,539,706 | 9/1985 | Mears et al. | 455/11.1 |
| 4,882,765 | 11/1989 | Maxwell et al. | 455/18 |
| 5,355,511 | 10/1994 | Hatano et al. | 455/11.1 |
| 5,408,679 | 4/1995 | Masuda | 455/11.1 |
| 5,434,490 | 7/1995 | Ishida et al. | 318/587 |

OTHER PUBLICATIONS

W. Diepstraten, et al., "Distributed Foundation Wireless Medium Access Control", *IEEE* 802.11,–93/190, pp. 1–69.

*Primary Examiner*—Russell W. Blum
*Attorney, Agent, or Firm*—Ostrolenk, Faber, Gerb & Soffen, LLP

[57] ABSTRACT

In a transmission system having a procedure to exchange control information at least one time between a first terminal and a second terminal to transfer data from the first terminal to the second terminal, a relay station receives control information transmitted from the first terminal and detects existence of the control information from the second terminal during a preset detection time interval from a time of reception of the control information. If the control information has not been detected, the relay station exchanges the control information with said first terminal instead of the second terminal, receives data from the first terminal and transfers the data to the second terminal.

23 Claims, 14 Drawing Sheets

ACCESS METHOD AND A RELAY STATION AND TERMINALS THEREOF

BACKGROUND OF THE INVENTION

This invention relates to an access method for bridge transfer in data transmission.

A conventional data transmission system using wireless communication technology has been proposed in IEEE 802.11. This document was written by Wim Diepstraten, Phil Belanger and Greg Ennis, and titled "Distributed Foundation Wireless Medium Access Control", IEEE document, DOC:IEEE P802 11-93/190 (referred to as Reference 1).

The above data transmission system executes the procedure to cause an addressed receiving station to always return a response to the transmitting station (except broadcast communications).

This system defines two types of network, Ad-Hoc Network and Infrastructure Network. The Infrastructure Network is a system provided with Access Points connected to wired networks. In this system, if the transmitting station cannot transmit signals directly to the destination station, it transmits the signal addressed to the destination station to the Access Point, from where the signal is transferred to the destination station.

FIG. 14 shows detailed operation of the access method described in Reference 1.

It is provided with a procedure to exchange control information 81, 82, and 84 when transmitting data 83.

The control information 81 is used for identifying the channel connectability to the destination terminal. The control information 82 is used for responding to the identification made by the control information 81. The control information 84 is used for acknowledging the data reception. The control information 81 and 82 contain information as to how long each terminal uses the channel afterward.

Each time interval 816, 812, and 813 has the shortest time interval used as a gap between exchange procedures.

Data 823 is subjected to the succeeding procedure started by another terminal after confirming termination of the transmission procedure.

The control information 86 is used by a relay station for the entire controlling. The preceding time interval 815 is longer than the time intervals 816, 812, and 813.

At a starting point of the exchange procedure, each time interval 811 and 814 spent for confirming connectability (channel occupation status) on the channel for transmission of control information 81 and data 823 is longer than the time interval 815. Each time interval 811 and 814 at the respective terminals is set to have a random time interval which is longer than at least the time interval 815. Upon receiving the control information 81 and 82, other terminals stop transmitting during the period for using the channel contained therein.

Each field 821 and 822 in this figure shows the occupation time interval contained in the control information 81 and 82, respectively.

Reference 1 describes the following program showing detailed operations.

In this program, the term RTS corresponds to the control information 81, CTS to the control information 82, data for a unicast to the data 83, Ack to the control information 84, DIFS to the time intervals 811 and 814, SIFS to time intervals 816, 812, and 813, and NAV to fields 821 and 822, respectively.

Each RTS, CTS, and Ack is required to have CRC added thereto. Backoff functions in suspending the process to move to succeeding operation for the period equivalent to the value derived from random number independently owned by each terminal.

The timer T1 in the following program indicates the time interval from transmitting the control information 81 to starting transmission of the data 83. The timer T3 indicates the time interval from transmitting the data 83 to terminating the transmission of the control information 84.

Algorithm for transmitting station:

When transmitting a unicast MPDU using RTS/CTS option:
    If medium free (No NAV and no CS) longer than DIFS, then transmit RTS.
    Else defer until DIFS gap is detected and go into backoff.
    If CTS is received within T1 after RTS, then transmit the DATA after SIFS.
    Else go into Retransmit_Backoff.
    If Ack not received within T3, then go into Retransmit_Backoff.

When transmitting a unicast MPDU not using the RTS/CTS option:
    If medium free (No NAV and no CS) longer than DIFS, then transmit DATA.
    Else defer until DIFS gap is detected, and go into backoff.
    If Ack not received within T3 then go into Retransmit_Backoff.

When transmitting a Broadcast/Multicast MPDU:
    If medium free (No NAV and no CS) longer than DIFS, then transmit DATA.
    Else defer until DIFS gap is detected, and go into backoff.

Algorithm for receiving station:
    If RTS frame is detected but station is not the destination, Then:
    Update the NAV with the Duration information and start a T1 timer.
    Else
    Return a CTS frame when medium free (No NAV and no CS) after SIFS.
    If T1 timer expires, and CS is not active at that time, then clear the NAV.
    If station is the destination of a unicast DATA frame, Then;
    Transmit Ack after SIFS when CRC was correct.

In the conventional system of the aforementioned Reference 1, it is necessary to previously identify whether or not signals can be directly transmitted so as to determine the need to transfer the signal to the Access Point before transmitting signals to the destination station.

However channel of the wireless communication has instable nature, and each condition of the individual terminals is likely to change, such as being mobile, depending on the occasional environmental change. The aforementioned problems will make it difficult to update the information at every occasion.

SUMMARY OF THE INVENTION

It is an object of the present invention to provide an access method and a system used therefor, which eliminates the need of determining at each terminal with respect to possibility of direct data transmission to its destination terminal, thus overcoming above problems.

It is another object of the present invention to provide an access method and the system used therefor, which functions in relaying requiring no particular operation of each terminal.

The objects of the present invention are achieved by an access method used for relaying and transferring data from a first terminal to a second terminal using a relay station when the data cannot be directly transmitted from the first terminal to the second terminal in a data transmission system having a procedure to exchange control information at least one time between the first terminal and the second terminal to transmit the data from the first terminal to the second terminal, the access method comprising: a step of receiving the control information transmitted from the first terminal in the relay station; a step of detecting existence of the control information from the second terminal during a preset detection time interval from a time of reception of the control information in the relay station; a first sequence step of making the relay station exchange the control information with the first terminal instead of the second terminal and receiving the data from the first terminal when the response has not been detected during the detection time interval in the relay station; and a second sequence step of exchanging the control information with the second terminal and transferring the data to the second terminal in the relay station.

In the present invention, after having received information from the first terminal, the relay station waits for a response from the second terminal during a preset time interval. If the second terminal does not respond during the preset time interval, the relay station exchanges the information with the first terminal instead of the second terminal, then it transfers the information to the second terminal.

Furthermore, the objects of the present invention are achieved by an access method of a transmission system having a plurality of terminals, comprising: a step of calculating a weight based on a product of an own terminal's active period and a number of terminals that have communicated with such terminal; a step of broadcasting the weighting information in each of the terminals and generating a weight information by adding own terminal's address to the weight; a step of receiving the weighting information and creating a weighting information list consisting of upper n weighting information in each of the terminals; and a step of functioning own terminal as a relay station when own terminal has biggest weight based on the weighting information list in each of the terminals.

This invention is provided with no particular relay station, instead its terminal determined to be able to relay the signal of the station as much as possible has a relay function allocated thereto.

BRIEF DESCRIPTION OF THE DRAWINGS

Other objects and features of the present invention will be described in more detail with reference to the accompanying drawings, in which.

DESCRIPTION OF THE PREFERRED EMBODIMENTS

Embodiments are hereinafter described. For the purpose of easy comprehension, the explanation is made with respect to the data transmission from a first terminal to a second terminal among a plurality of terminals via a relay station.

A first embodiment is explained.

The first and the second terminals are described.

Figure 1:
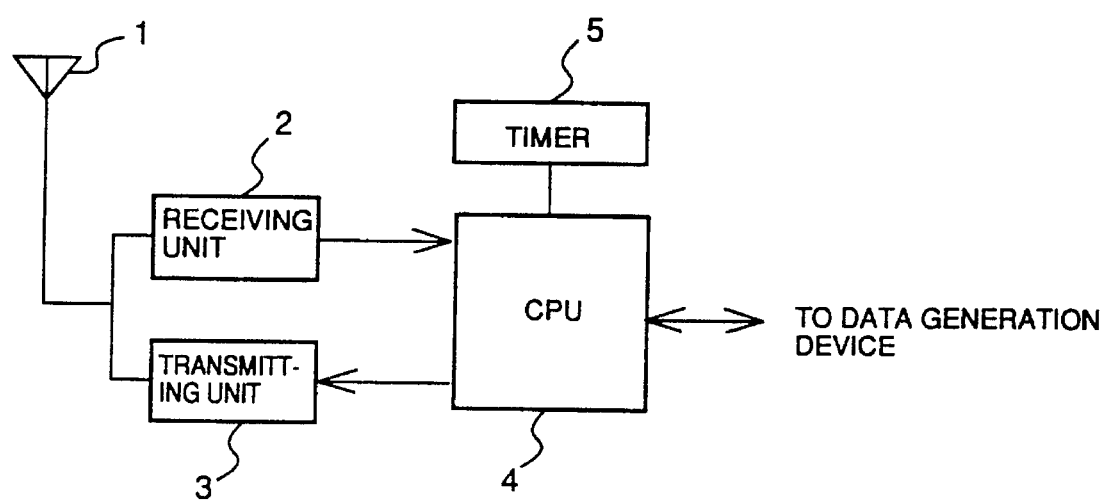
FIG. 1 is a block diagram of a first embodiment.
Figure 2:
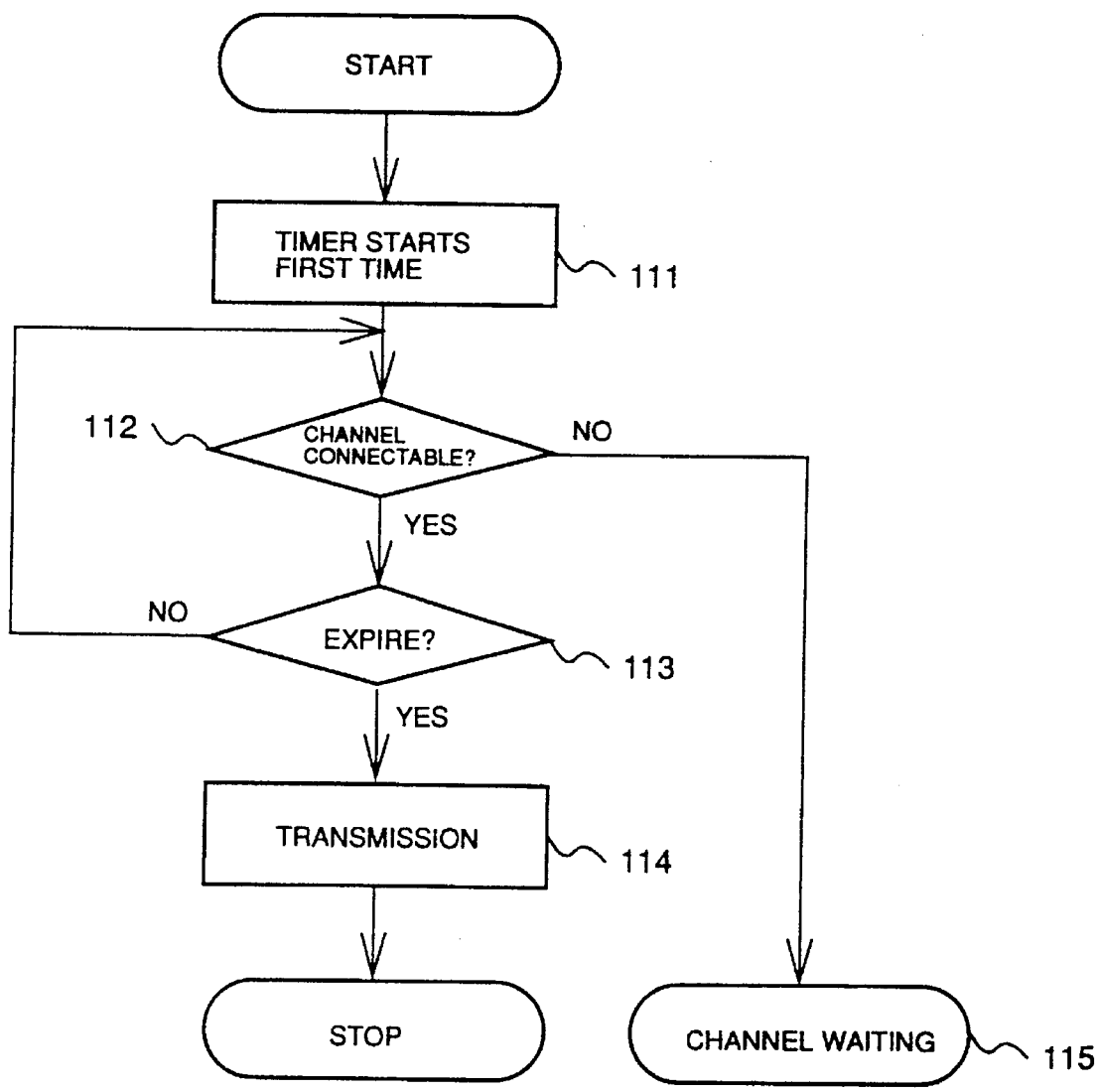
FIG. 2 is a flowchart showing an operation of the first embodiment.
Figure 3:
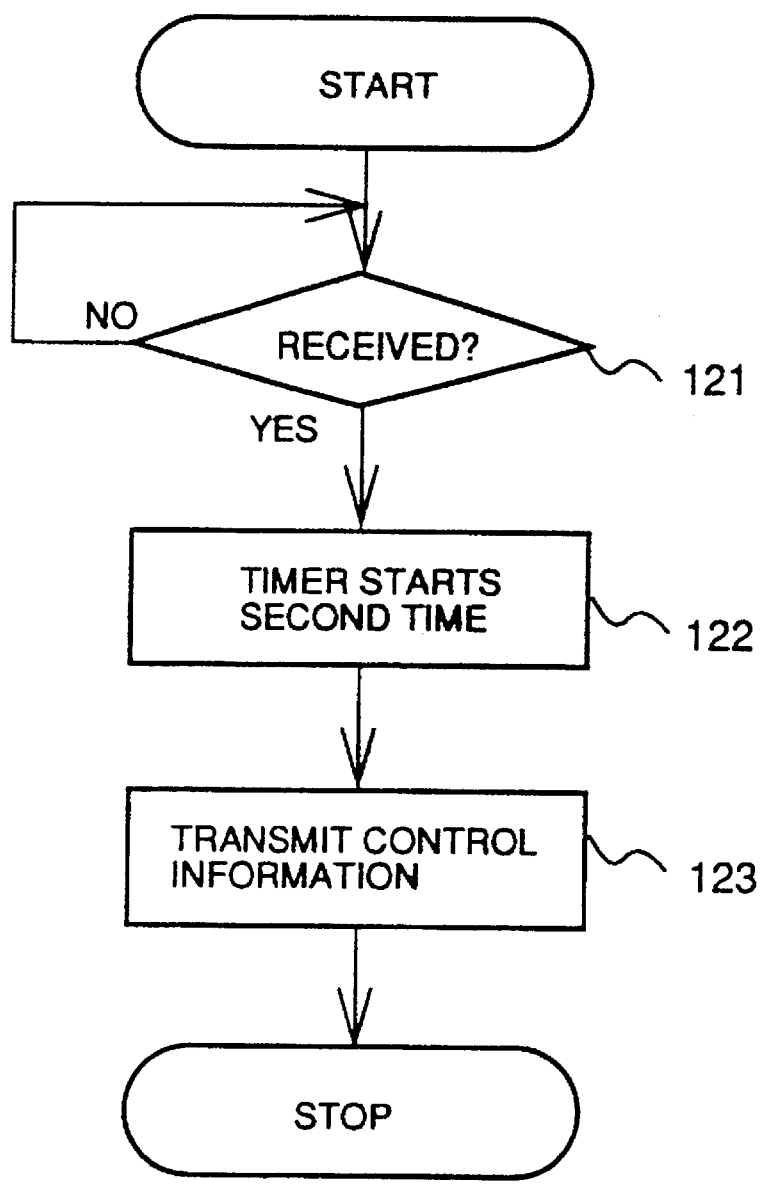
FIG. 3 is a flowchart showing an operation of the first embodiment.

FIG. 1 is a block diagram of the first and the second terminals. FIG. 2 is a flowchart showing an operation of the first terminal. FIG. 3 is a flowchart showing an operation of the second terminals.

Each of the first and the second terminals is provided with an antenna 1, a receiving unit 2, a transmitting unit 3, CPU4, and a timer 5, respectively.

An explanation of the first terminal is described below.

The CPU 4 starts the timer 5 (111), which identifies whether or not the channel is unused for Time 1 (112). For this identification step, the timer 5 is started by setting to Time 1 to check unused status on the channel until the expiration is detected (113).

If it is determined that the channel has been busy before detecting the expiration, it proceeds to defer mode (115). While if the expiration is detected with the channel kept unused, the transmitting unit 3 transmits data (114).

When one or more terminals are waiting for transmission data, assuming that all stations start transmitting simultaneously after the elapse of Time 1, data conflict will be inevitable. In order to reduce such data conflict rate, generally each station is so set to defer for the period determined by adding random period at least to Time 1.

An explanation of the second terminal is described below.

The CPU 4 starts the timer 5 in response to receiving data or control information addressed to its own terminal at the receiving unit 1 (121), and defers until Time 2 expires (122). The Time 2 is so set to have shorter time interval than that of the aforementioned Time 1.

The CPU 4 controls the transmitting unit 3 to transmit the control information as a response to the received data or control information (123).

The explanation of the relay station is described below.

Figure 4:
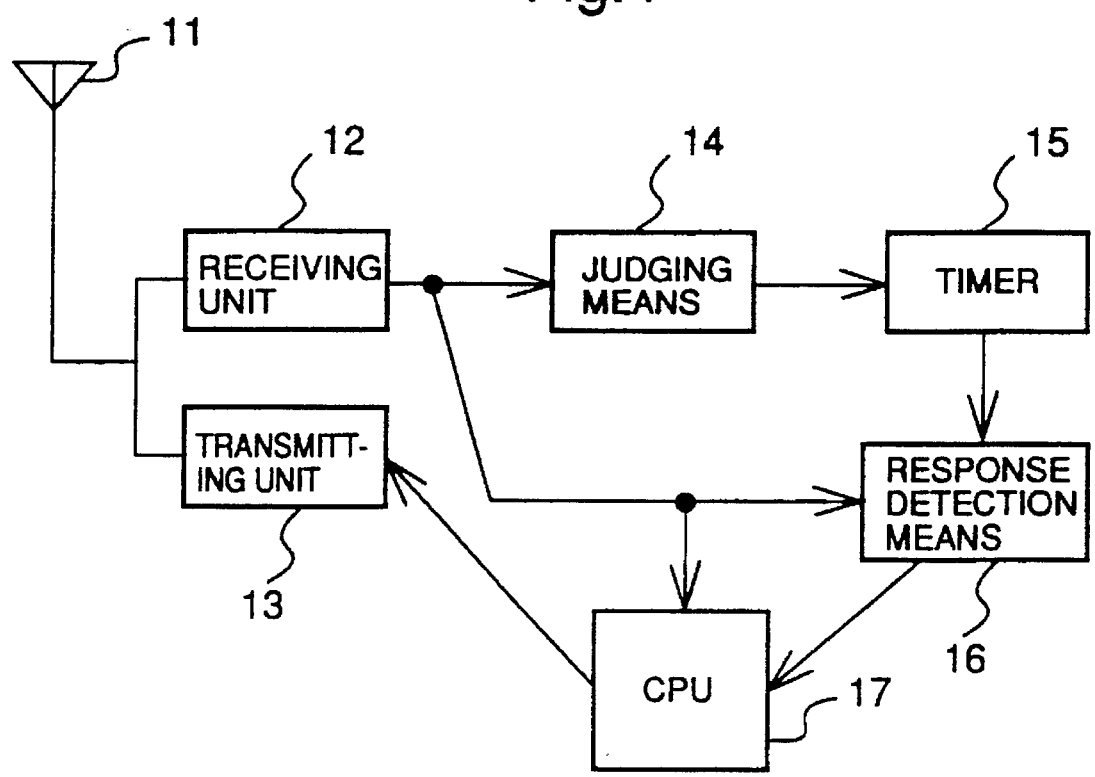
FIG. 4 is a block diagram of the first embodiment.
Figure 5:
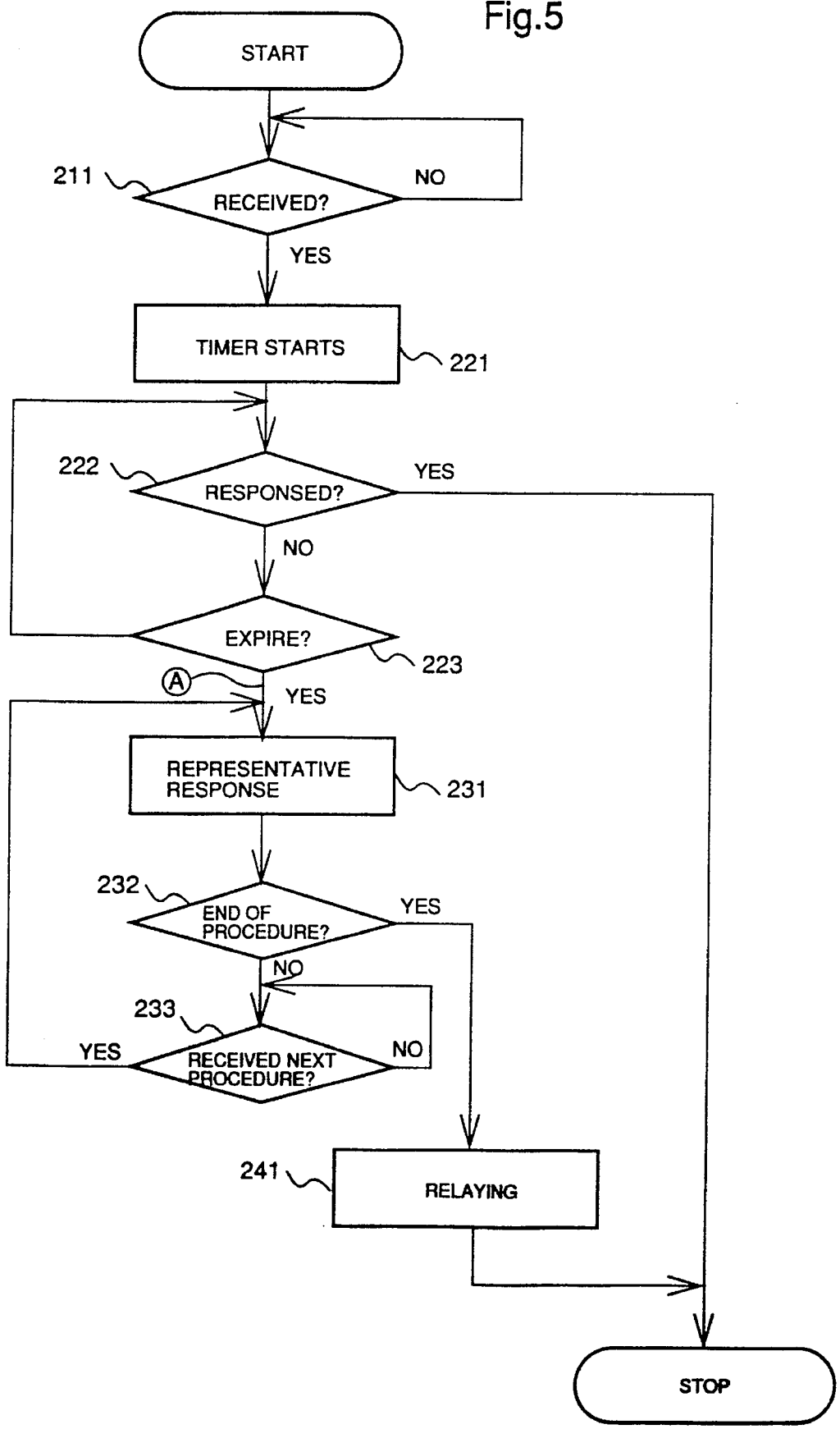
FIG. 5 is a flowchart showing an operation of the first embodiment.

FIG. 4 is a block diagram of the relay station. FIG. 5 is a flowchart showing an operation of the relay station.

In FIG. 4, a reference numeral 11 is an antenna, 12 is a receiving unit, 13 is a transmitting unit, 14 is a judging means, 15 is a timer, 16 is a response detection means, and 17 is a CPU.

The signal from the first terminal received by the antenna 11 is demodulated into control information or data through the receiving unit 12, then output to the judging means 14.

The judging means 14 determines whether or not the demodulated information is control information transmitted form the first terminal (211). If the information is determined as the control information, it starts the timer 15 (221). The time interval set for the timer 15 is to be Time 3 that has shorter time interval than Time 1 and longer time interval than Time 2.

The response detection means 16 detects the response from the second terminal until the timer 15 expires (222). In case it detects no response, the second terminal is determined to be in the area which is not connectable to the first terminal, and a signal containing such information is output to the CPU17 (223).

The CPU 17 starts to perform representative response to the first terminal in place of the second terminal based on a predetermined procedure (231).

The CPU 17 representatively responds to the received control information. It determines whether or not the procedure has been finished (232). If it determines that the procedure has not been finished yet, it waits until receiving the next procedure (233).

Upon receiving the next procedure, it representatively responds to the corresponded control information until the procedure is finished. If the procedure is determined to have been finished (232), the process proceeds to relay process.

At this relay process, the transmitting unit 3 transmits the transmission data of the first terminal (except control information) to the channel again for transferring the transmission data to the second terminal (241).

A series of operations are explained as an example 10 combining the first embodiment and the prior art described in the Reference 1.

Figure 6:
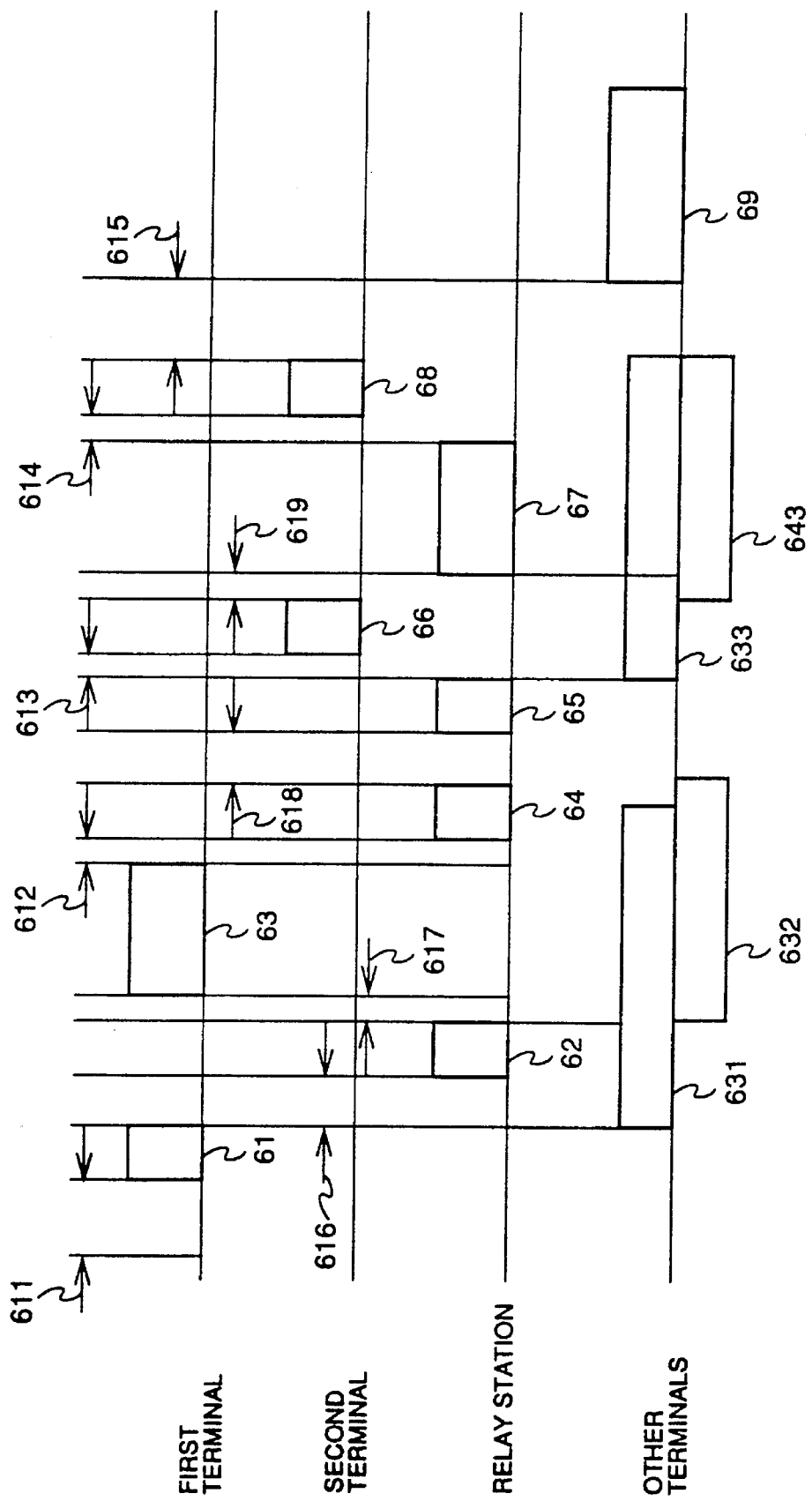
FIG. 6 is a time chart showing the first embodiment.

In FIG. 6, time intervals 611 and 615 correspond to 811, which is equivalent to Time 1. Time intervals 617, 612, 613, 614 and 619 correspond to 812, equivalent to Time 2. Time intervals 616 and 618 equivalent to Time 3.

After confirming that the channel has been unused for Time 1 (time interval 611), the first terminal transmits control information 61.

Supposing that the second terminal is out of field supported by the first terminal, the control information 61 fails to reach the second terminal.

While the relay station receives the control information 61 from the first terminal, where the judging means 14 performs judgment to start the timer 15. In case of no response from the second terminal even after the elapse of Time 3 (time interval 616), the response detection means 16 detects expiration of the timer, then proceeding to the representative response.

The relay station serves to respond in place of the second terminal, by which control information 62 indicating channel connectability is transmitted to the first terminal.

Receiving the control information 62, the first terminal transmits data 63 after the elapse of Time 2 (time interval 617). Upon receiving the data, the relay station transmits control information 64 to the first terminal.

The above correspondence between the relay station and the first terminal is referred to as a first sequence process.

When the first sequence process is terminated, a second sequence process, i.e., relay process, is started.

In order to prevent other terminals from starting the respective communication concurrently, the process uses Time 3 for a waiting time until start of relaying.

The relay station transmits control information 65 which contains the same information as that transmitted from the first terminal to the second terminal for checking connectability of the transmitting channel.

Upon receiving control information 66 as a response to the control information 65 from the second terminal, the relay station transmits data 67 which is the same as the data 63 which has been already received thereby to the second terminal.

Upon receiving the data 67, the second terminal finally transmits control information 68 to terminate the relay process.

The time intervals 612 and 619 used in this process are set to Time 2. However they may be set to Time 3, shorter than Time 1, as far as they serve to prevent other stations from starting the respective data transmission procedures.

Other terminals delay the start of their transmission for the period required to use the channel contained in control information 61, 62, 65, and 66. The periods corresponding to the above control information are 631, 632, 633 and 634, respectively.

The first embodiment provides an advantage to eliminate the need to determine whether the transmitting terminal is able to transmit data directly to its addressed terminal, or relay process is required. This embodiment prevents other terminals from starting their own transmission procedures during relay processing.

This is the end of the explanation of the first embodiment.

The second embodiment is described below.

The second embodiment relates to a relay process in broadcast transmission.

Figure 7:
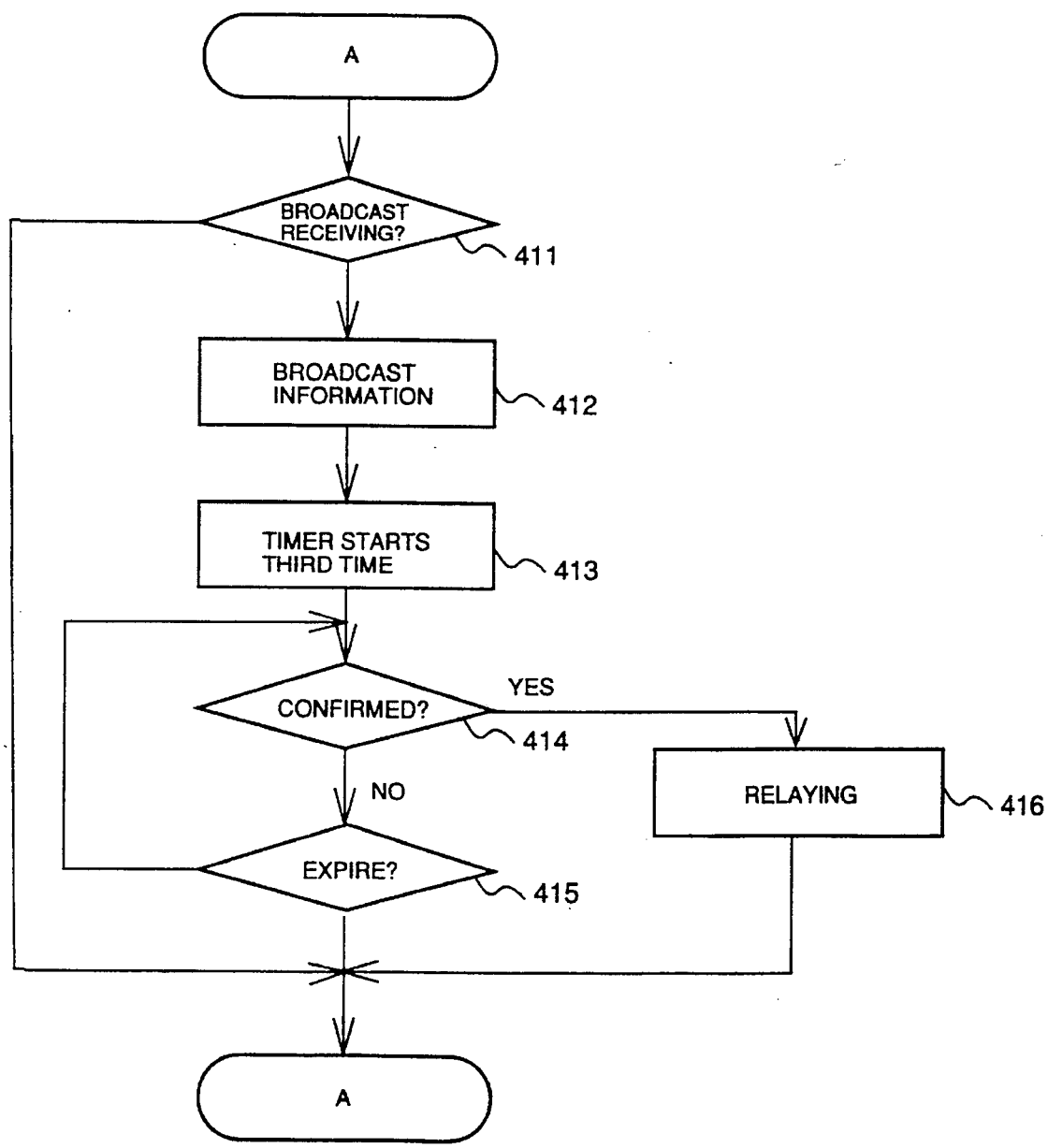
FIG. 7 is a flowchart showing an operation of a second embodiment.

FIG. 7 is a flowchart showing an operation of the second embodiment, which is inserted to a point A of the first embodiment in FIG. 5. The second embodiment assumes to have broadcast transmission to a plurality of terminals including the first and the second terminals.

When the timer 15 expires, a judging means 14 determines if information from the first terminal is subjected to broadcast transmission (411). If the information is determined to be on broadcast transmission, it starts broadcast relaying (412). The relay station informs a plurality of terminals including the second terminal that broadcast transmission has been executed.

The judging means 14 starts the timer 15 (413) to wait for receiving responses from the terminals including the second terminal (414). The timer 15 is so set to Time 3.

The response detection means 16 detects whether broadcast relay request has been returned from a certain terminal. In case of no relay request until expiration of the timer 15, no process is executed, thus returning to the point A.

While in case of receiving the relay request from some terminal before expiration is detected by the response detection means 16 (415), the CPU 17 serves to transmit the received broadcast packet to the channel via the relay station, assuming that the destination terminal is out of the field supported by the first terminal.

If the destination terminal receives no broadcast transmission from the first terminal but broadcast information from the relay station, it determines to be out of the field supported by the transmitting terminal, thus transmitting the relay request to the relay station.

The operation of the example combining the second embodiment and the prior art of the Reference 1 is described in detail.

Figure 8:
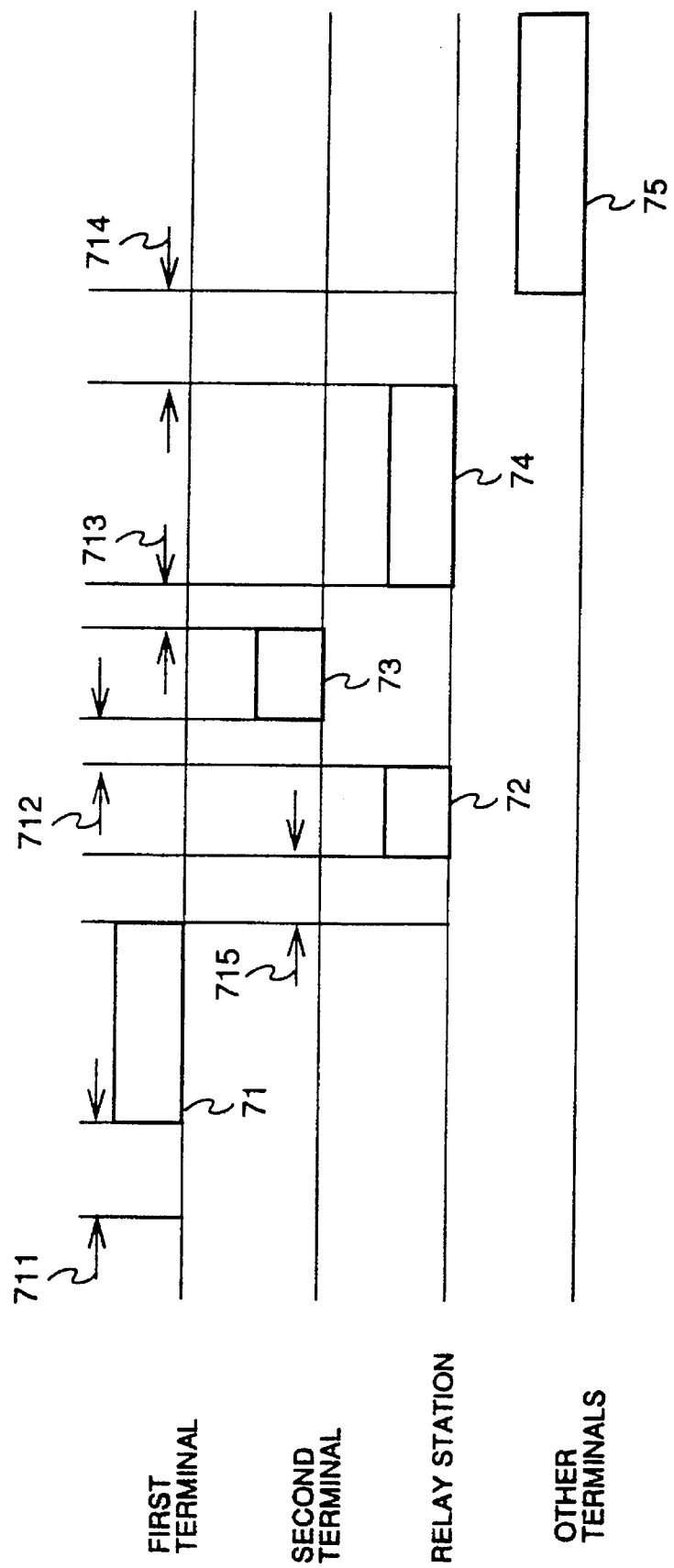
FIG. 8 is a time chart showing the second embodiment.

FIG. 8 is a time chart showing the second embodiment.

In the Reference 1, the procedure for broadcast counts 0, which is intended for broadcast data transmission only. Broadcast data 71 are transmitted after confirming unused status of the channel for an time interval 711. A conventional method finishes its operation at the above stage, which fails in clarifying as to which station has received the data.

So the relay station defers for Time 3 (time interval 715) after receiving data 71 from the first terminal, then broadcasts the control information 72 that indicates execution of broadcast transmission to all terminals. This procedure sets the deferring period to Time 3 (time interval 715). However it may be set to Time 2 as far as keeping other terminals from starting their own transmission concurrently.

The relay station defers for the relay request within Time 3 (time interval 712).

Upon receiving control information 73 indicating relay request from the second terminal, the relay station transmits data 74 containing the received broadcast transmission data 71 to the second terminal, and terminates the operation procedure.

After finishing the transmission, another terminal starts operating its own transmission procedure 75 after the elapse of at least Time 1 (time interval 714).

The second embodiment provides an advantage to eliminate double transmission of the transmitting terminal in case there is a terminal that cannot be communicated with at least one station.

This is the end of the explanation of the second embodiment.

Following description is a program of the present invention to be added to that described in Reference 1 for realizing the operation shown in FIGS. 6 and 7. There is no change in algorithm for the transmitting station. While in the algorithm for the receiving station, the following program is added to that for the receiving station of Reference 1.

If the station is a broadcast receiving station stated in ATB frame and receives no broadcast data prior to receiving ATB, then transmit RTB after SIFS when CRC was correct.

The relay station is provided with the following bridge algorithm as well as algorithm for the above transmitting and receiving stations.

If RTS frame is detected but the station is not the destination, then defer at PIFS.

If CS is not active and CTS frame is not detected, then transmit CTS frame when the CRC was correct.

If the station receives data frame to be transmitted to the succeeding unicast, then transmit Ack to be transmitted to transmission queue after SIFS when CRC was correct.

Else If station receives data frame subjected to multicast, then transmit ATB after PIFS when CRC was correct.

If station receives RTB after SIFS or detects carrier sense, then transmit received data frame.

The following terms of the program in the present invention correspond to the respective items shown in FIG. 8. That is, ATB corresponds to 72, RTB to 73, and PIFS to 715, respectively. Each definition of those items such as data, DIFS, SIFS, CRC, and the like is equivalent to that of the program described in Reference 1.

An explanation of a third embodiment is described.

The third embodiment is a method which detects whether or not the response is made at every receipt of packet, and in case of no response, the received packet is relayed.

Figure 9:
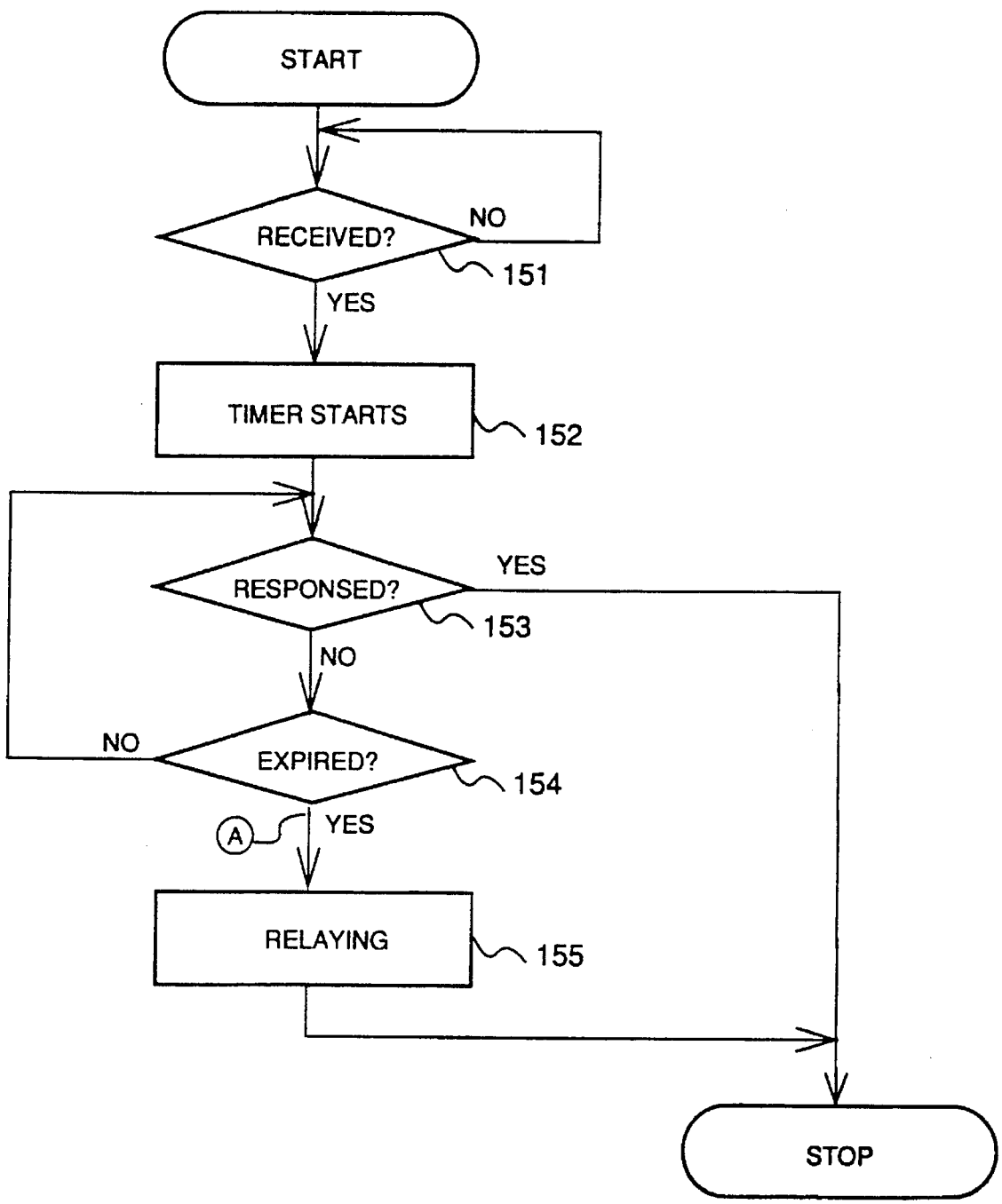
FIG. 9 is a flowchart showing an operation of a third embodiment.

FIG. 9 is a flowchart showing an operation of the third embodiment.

Upon receiving data from the first terminal via a receiving unit 12 (151), the judging means 14 starts the timer 15 (152). In this operation the timer 15 is so set to Time 3 until it expires.

If receiving the response from the second terminal before the response detection means 16 detects expiration of the timer 15 (153), the operation is terminated.

If receiving no response from the second terminal before the response detection means 16 detects the expiration (154), the CPU 17 transmits the received packet on the channel again (155), assuming that the second terminal is out of the field supported by the first terminal. Then the packet is transferred via the relay station between the first and the second terminals.

As aforementioned, in the third embodiment, transmission data and control information transmitted for data transmission are not distinguished. In case the transmitting terminal further transmits additional control information to the response from the receiving terminal, it is assumed to be in the response to the preceding correspondence, thus, repeating the same process as shown in FIG. 9.

The operation of the third embodiment is described in more detail.

Figure 10:
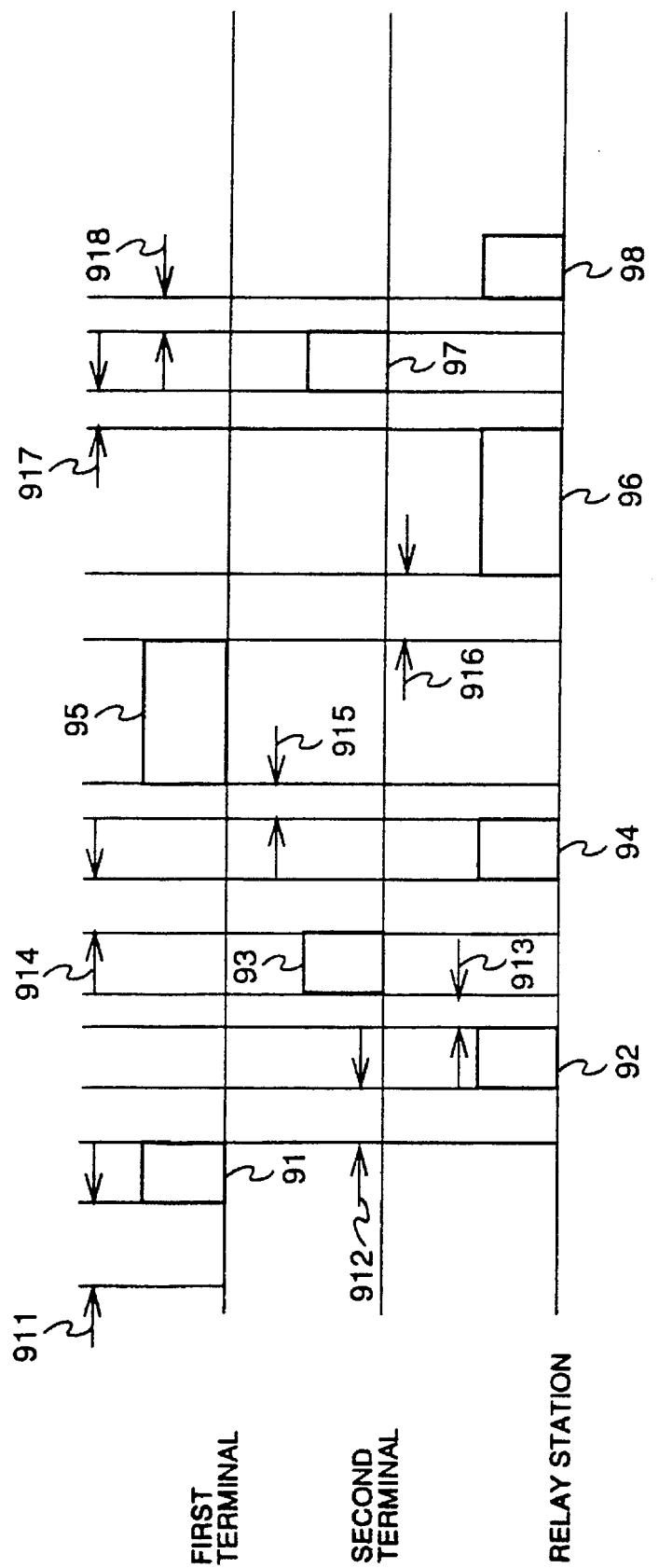
FIG. 10 is a time chart showing the third embodiment.

FIG. 10 is a time chart showing the third embodiment. In FIG. 10, a time interval 911 corresponds to Time 1, 913, 914, 915, 916, 917 and 918 to Time 2, and 912 to Time 3.

When the first terminal transmits control information 91, the relay station receives the control information 91 to start the timer 15, and defers for Time 3 (time interval 912). In case control information 93 is not returned from the second terminal until the expiration of Time 3, the relay station determines that the second terminal is out of the field directly supported by the first terminal, and transmits control information 92, which is the same as the control information 91 to the second terminal.

Upon receiving the control information 92, the second terminal transmits control information 93 corresponding thereto.

Receiving the control information 93 from the second terminal, the relay station transmits it as control information 94 to the first terminal.

Receiving the control information 94, the first terminal transmits data 95. Receiving the data 95, the relay station relays the data 95 as data 96 to the second terminal.

The second terminal receives the data 96, and transmits control information 97.

The relay station receives the control information 97, and transmits control information 98.

Time intervals 914, 916, and 918 may be set to Time 3. The second embodiment may be added to this third embodiment.

This is the end of the explanation of the third embodiment.

An explanation of a fourth embodiment is described below.

In the fourth embodiment provided with only terminals and no relay station, a certain terminal is selected to function as a relay.

Figure 11:
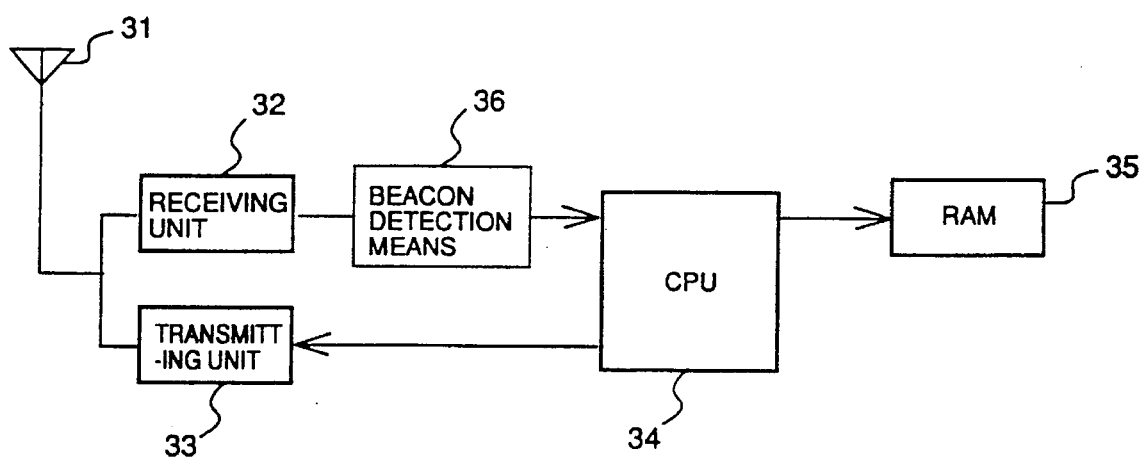
FIG. 11 is a block diagram of a fourth embodiment.
Figure 12:
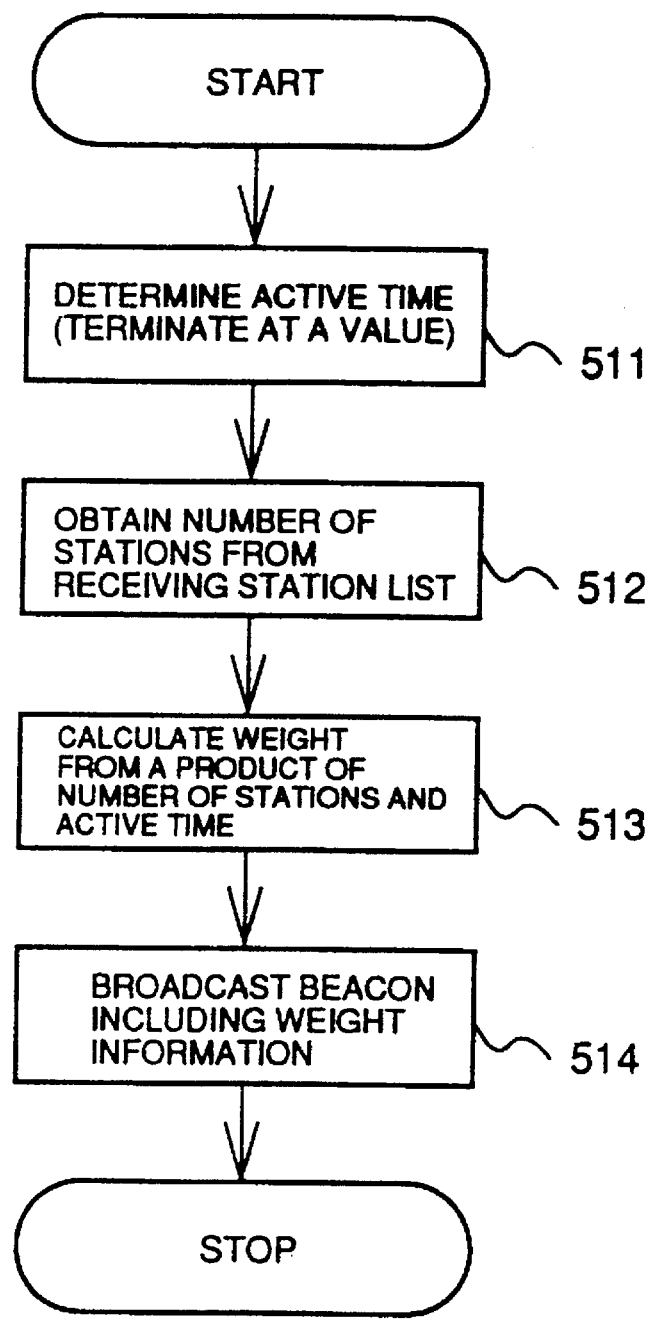
FIG. 12 is a flowchart showing an operation of the fourth embodiment.
Figure 13:
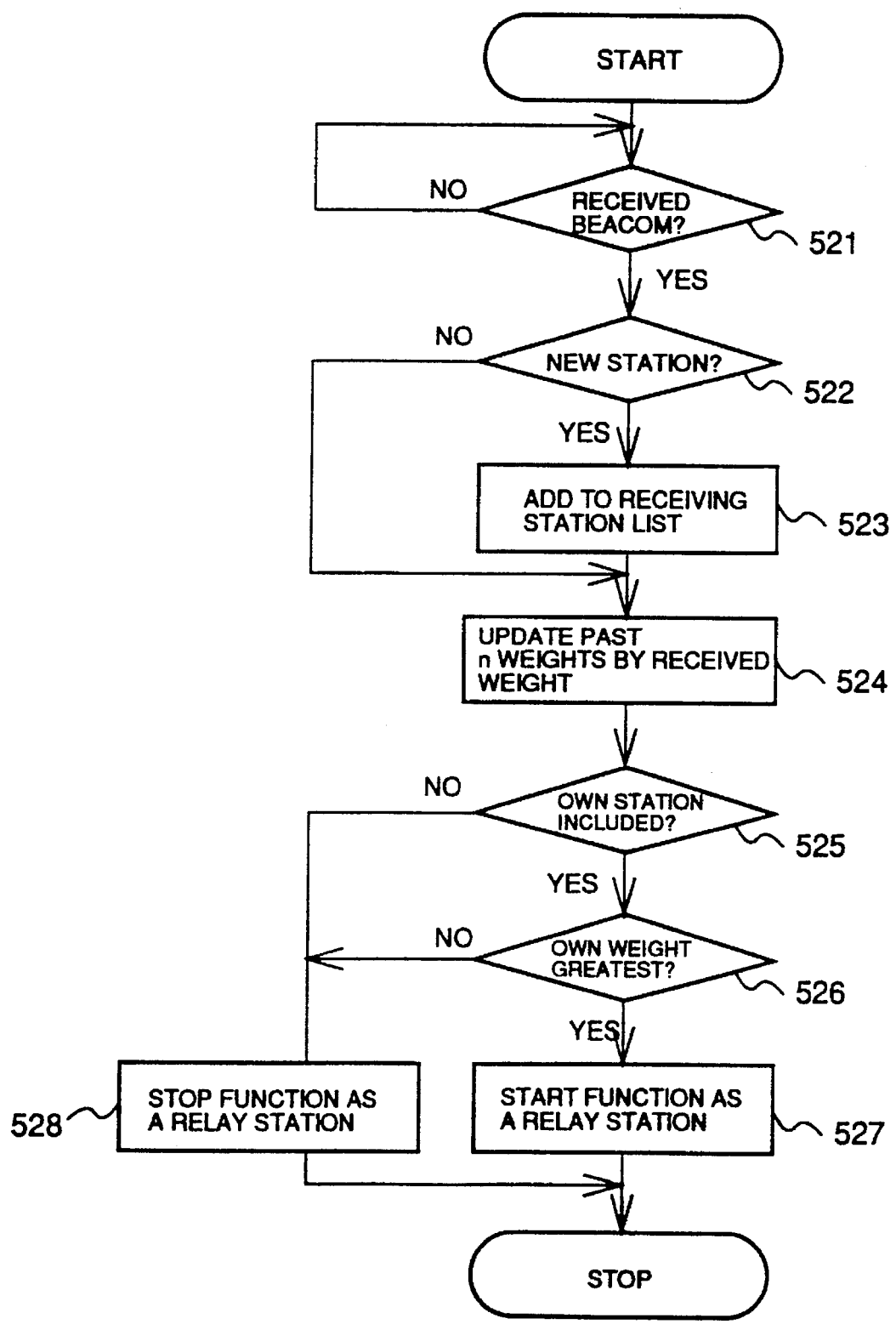
FIG. 13 is a flowchart showing an operation of the fourth embodiment.
Figure 14:
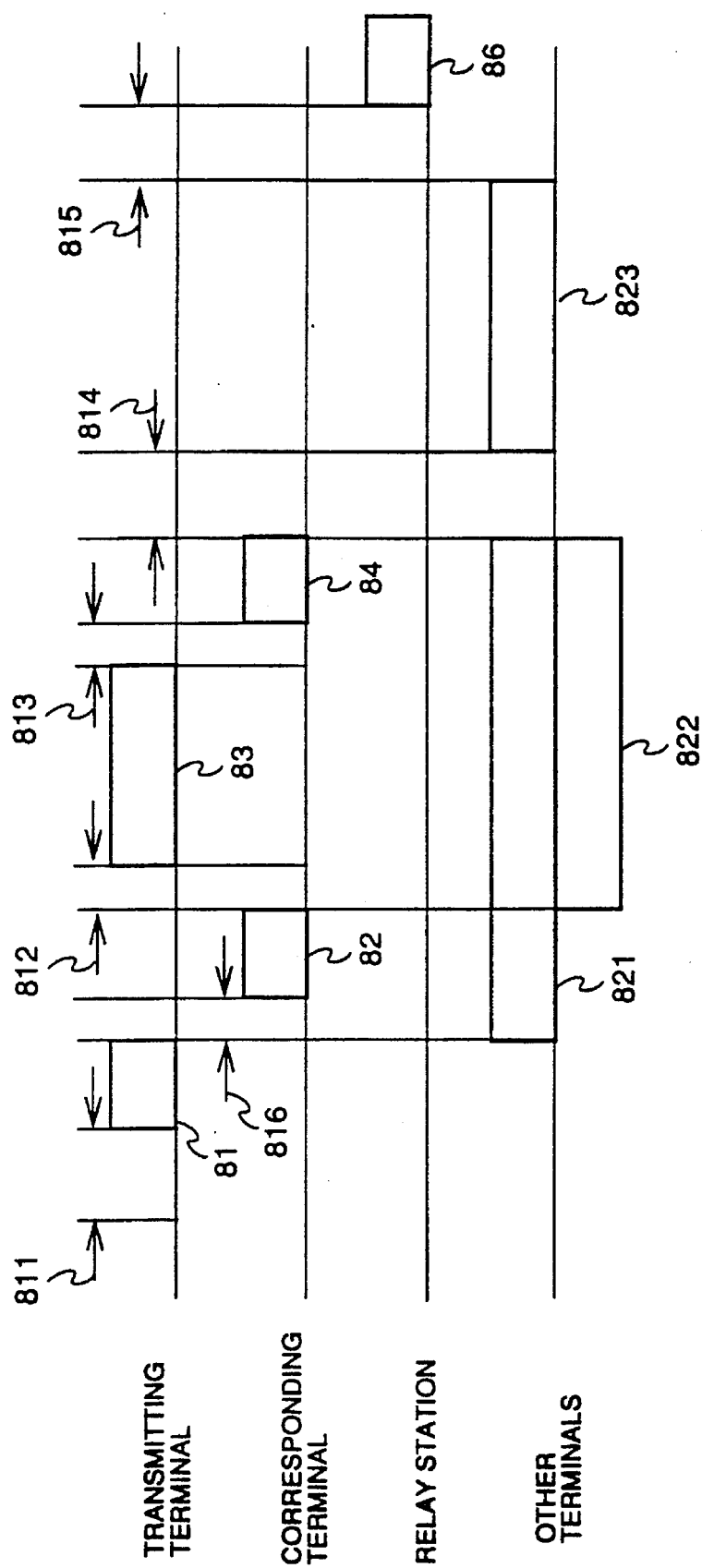
FIG. 14 is a time chart showing a prior art.

FIG. 11 is a block diagram of each terminal. FIGS. 12 and 13 are flowcharts showing the operation of the embodiment.

Each terminal obtains active period of its station with CPU 34 (511). The active period refers to the time interval from starting the terminal to the present time, which may have the upper limit if it will increase to substantially a great value.

The process is executed by counting the number of stations currently contained in a receiving station list stored in RAM 35 (512). The receiving station list refers to the list which contains address of the terminal which has transmitted a Beacon and weighting information thereof (described later).

The CPU 34 calculates the weighting information by multiplying the active period by the number of stations (513). A Beacon containing the weighting information is broadcasted from the transmitting unit 33 (514). The above process is repeatedly executed.

When the Beacon detection means 36 detects the receipt of the Beacon, the following processes are executed (521).

The CPU 34 determines whether the terminal corresponding to received Beacon has been already listed in the receiving station list stored in the RAM 35 (522). If it is determined not to have been listed, the address of the terminal is added to the receiving station list (523). The weighting information contained in the received Beacon is extracted. The oldest weighting information among those obtained n times in the past is erased. It then adds the weight and address of the newly received Beacon for updating the weighting list.

It is judged whether or not the address of the subject station is contained in n times of the weight list in the past (525). If it is not contained and yet the station employs the function of the relay station, the operation is terminated (528).

If it is contained, it is judged whether or not the subject station has the greatest weight among (n−1) weights as a result of excluding its own weight from the weight list obtained n times in the past (526). In case it is determined to have the greatest weight, it is regarded as a relay station (527) for executing relay process described in the first, second, and third embodiments.

The fourth embodiment provides no specific relay station, in which the terminal that can relay signals of the stations as many as possible is selected to have a relay function allocated thereto. This provides an effective relay function in distributed network.

What is claimed is:

1. An access method used for relaying and transferring data from a first terminal to a second terminal using a relay station when the data cannot be directly transmitted from said first terminal to said second terminal in a data transmission system having a procedure to exchange control information at least one time between said first terminal and said second terminal to transmit said data from said first terminal to said second terminal, said access method comprising:

a step of receiving said control information transmitted from said first terminal in said relay station;

a step of detecting a response of said control information from said second terminal during a preset detection time interval from a time of reception of said control information in said relay station;

a first sequence step of exchanging, instead of said second terminal, said control information with said first terminal and receiving said data from said first terminal when said response has not been detected during said detection time interval in said relay station; and a second sequence step of exchanging said control information with said second terminal and transferring said data to said second terminal in said relay station.

2. The access method of claim 1, wherein said detection time interval is set so as to be:

shorter than a time needed for confirming channel occupation status before start of transmission by said first terminal; and longer than a time from reception of said control information to transmission of a response to said control information.

3. The access method of claim 1, wherein a waiting time interval from said first sequence step to said second sequence step is set so as to be:

shorter than a time needed for confirming channel occupation status before start of transmission by said first terminal; and longer than a time from reception of said control information to transmission of a response to said control information.

4. An access method used for relaying and broadcasting broadcast data in a data transmission system having a procedure to exchange control information at least one time between terminals, said access method comprising:

a step of broadcasting said broadcast data to a plurality of terminals in a first terminal;

a step of broadcasting broadcast information that informs of completion of broadcasting to said terminals when said broadcast data has been received in a relay station;

a step of transmitting a relay request to said relay station when having received only said broadcast information in each of said terminals;

a step of detecting said relay request during a preset detection time interval from the time when said broadcast information had been transmitted in said relay station; and a step of transferring said broadcast data to a terminal that had transmitted said relay request when said relay request has been detected during said detection time interval in said relay station.

5. The access method of claim 4, wherein said detection time interval is set so as to be:

shorter than a time needed for confirming channel occupation status before start of transmission by said first terminal; and longer than a time from reception of said control information to transmission of a response to said control information.

6. An access method used for relaying and transferring data from a first terminal to a second terminal using a relay station when the data cannot be directly transmitted from said first terminal to said second terminal in data information transmission system having a procedure to exchange control information at least one time between said first terminal and said second terminal to transmit said data information from said first terminal to said second terminal, said access method comprising:

a step of receiving said information selected from the group consisting of said control information and said data information transmitted from said first terminal in said relay station;

a step of detecting existence of a response of said information from said second terminal during a preset detection time interval from a time of reception of said information in said relay station;

a step of transferring said information to said second terminal when said response has not been detected during said detection time interval in said relay station.

7. The access method of claim 6, wherein said detection time interval is set so as to be:

shorter than a time needed for confirming channel occupation status before start of transmission by said first terminal; and longer than a time from reception of said control information to transmission of a response to said control information.

8. An access method of a transmission system having a plurality of terminals, comprising:

a step of calculating weight based on a product of a terminal's active period and a number of other terminals that have communicated with said terminal;

a step of generating a weighing information by adding an address of said terminal to said weight;

a step of broadcasting said weighing information in each terminal;

a step of receiving said weighing information and creating a weighing information list consisting of upper n weighing information in each terminal; and a step of said terminal functioning as a relay station when said terminal has a biggest weight based on said weighing information list of each terminal.

9. The access method of claim 8, further comprising a step of suspending a function as a relay station when said terminal is not included in said weighting information list and said terminal is functioning as a relay station.

10. The access method of claim 8, transferring data from a first terminal to a second terminal using a third terminal as a relay station when said data cannot be directly transmitted from said first terminal to said second terminal in a data transmission system having a procedure to exchange control information at least one time between said first terminal and said second terminal to transmit said data from said first terminal to said second terminal, said access method comprising:

a step of receiving said control information transmitted from said first terminal in said third terminal;

a step of detecting existence of control information from said second terminal during a preset detection time interval from a time of reception of said control information in said third terminal;

a first sequence step of exchanging, instead of said second terminal, said control information with said first terminal and receiving said data from said first terminal when said control information has not been detected during said detection time interval in said third terminal; and a second sequence step of exchanging said control information with said second terminal and transferring said data to said second terminal in said third terminal.

11. The access method of claim 10, wherein said detection time interval is set so as to be:

shorter than a time needed for confirming channel occupation status before start of transmission by said first terminal; and longer than a time from reception of said control information to transmission of a response to said control information.

12. The access method of claim 10, wherein a weighting time interval between said first sequence step and said second sequence step is set so as to be:

shorter than a time needed for confirming channel occupation status before start of transmission by said first terminal; and longer than a time from reception of said control information to transmission of a response to said control information.

13. The access method of claim 8, wherein a second terminal functions as a relay station when a first terminal broadcasts broadcast data to a plurality of terminals, said access method comprising:

a step of broadcasting said broadcast data to said terminals in said first terminal;

a step of broadcasting broadcast information that informs of completion of broadcasting to said terminals when said broadcast data has been received in said second terminal;

a step of transmitting a relay request to said second terminal when having received only said broadcast information in each of said terminals;

a step of detecting said relay request during a preset detection time interval from the time when said broadcast information had been transmitted in said second terminal; and a step of transferring said broadcast data to a terminal that had transmitted said relay request when said relay request has been detected during said detection time interval in said second terminal.

14. The access method of claim 8, transferring data information from a first terminal to a second terminal using a third terminal as a relay station when said data information cannot be directly transmitted from said first terminal to said second terminal in a data transmission system having a procedure to exchange control information at least one time between said first terminal and said second terminal to transmit said data from said first terminal to said second terminal, said access method comprising:

a step of receiving information selected from the group consisting of said control information and said data information transmitted from said first terminal in said third terminal;

a step of detecting a response of said information from said second terminal during a preset detection time interval from a time of reception of said information in said third terminal;

a step of transferring said information when said response has not been detected during said detection time interval in said third terminal.

15. The access method of claim 14, wherein said detection time interval is set so as to be:

shorter than a time needed for confirming channel occupation status before start of transmission by said first terminal; and longer than a time from reception of said control information to transmission of a response to said control information.

16. A relay station for relaying and transferring data from a first terminal to a second terminal when said data cannot be directly transmitted from said first terminal to said second terminal in a data transmission system having a procedure to exchange control information at least one time between said first terminal and said second terminal to transmit said data from said first terminal to said second terminal, said relay station comprising:

means for receiving and judging said control information transmitted from said first terminal and judging said control information from among said information;

means for detecting a response of said control information from said second terminal during a preset detection time interval from a time of reception of said control information;

means for exchanging, instead of said second terminal, said control information with said first terminal, receiving said data from said first terminal, exchanging said control information with said second terminal and transferring said data to said second terminal when said response has not been detected during said detection time interval.

17. The relay station of claim 16, further comprising said detection means having said detection time interval that is set so as to be:

shorter than a time needed for confirming channel occupation status before start of transmission by said first terminal; and longer than a time from reception of said control information to transmission of a response to said control information between said first terminal and said second terminal.

18. A relay station for relaying and transferring data information from a first terminal to a second terminal when said data information cannot be directly transmitted from said first terminal to said second terminal in a data transmission system having a procedure to exchange control information at least one time between said first terminal and said second terminal to transmit said data information from said first terminal to said second terminal, said relay station comprising:

means for receiving information selected from the group consisting of said control information and said data information transmitted from said first terminal;

means for detecting a response of said information from said second terminal during a preset detection time interval from a time of reception of said information;

means for transferring said information to said second terminal when said response has not been detected during said detection time interval.

19. The relay station of claim 18, further comprising said detection means having said detection time interval that is set so as to be:

shorter than a time needed for confirming channel occupation status before start of transmission by said first terminal; and longer than a time from reception of said control information to transmission of a response to said control information between said first terminal and said second terminal.

20. An access system used for relaying and broadcasting a broadcast data in a data transmission system having a procedure to exchange control information at least one time between terminals to transmit not broadcast a data, said access system comprising:

a first terminal having means for broadcasting said broadcast data;

a relay station having means for broadcasting broadcast information that informs of completion of broadcasting when said broadcast data has been received, means for detecting a relay request during a preset detection time interval from the time when said broadcast information had been transmitted, and means for broadcasting said broadcast data to a terminal that had transmitted said relay request when said relay request has been detected during said detection time interval; and each of said terminals having means for transmitting said relay request to said relay station when having received only said broadcast information.

21. The relay station of claim 20, further comprising said detection means having said detection time interval that is set so as to be:

shorter than a time needed for confirming channel occupation status before start of transmission by said first terminal; and longer than a time from reception of said control information to transmission of a response to said control information between said first terminal and said second terminal.

22. A terminal device used for mobile communication systems comprising:

means for calculating weight based on a product of a terminal's active period and a number of other terminals that have communicated with said own terminal, and generating weighting information by adding said terminal's address to said weight;

means for broadcasting said weighting information;

means for receiving said weighting information from other terminals and creating a weighting information list consisting of upper and n weights;

means for setting said terminal as a relay station when said terminal has biggest weight among weights stored in said weighting information list.

23. The terminal device of claim 22, further comprising said setting means for suspending a function as a relay station when own terminal is not included in said weighting information list and own terminal is functioning as a relay station.

* * * * *